US007623105B2

(12) United States Patent
Li et al.

(10) Patent No.: US 7,623,105 B2
(45) Date of Patent: Nov. 24, 2009

(54) LIQUID CRYSTAL DISPLAY WITH ADAPTIVE COLOR

(75) Inventors: Baoxin Li, Vancouver, WA (US); Xiao-Fan Feng, Vancouver, WA (US); Scott J. Daly, Kalama, WA (US); M. Ibrahim Sezan, Camas, WA (US); Petrus J. L. van Beek, Camas, WA (US); Hao Pan, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 688 days.

(21) Appl. No.: 10/993,897

(22) Filed: Nov. 19, 2004

(65) Prior Publication Data
US 2005/0117186 A1   Jun. 2, 2005

Related U.S. Application Data

(60) Provisional application No. 60/524,321, filed on Nov. 21, 2003.

(51) Int. Cl.
*G09G 3/36*  (2006.01)
*G09G 5/00*  (2006.01)
*G09G 5/10*  (2006.01)

(52) U.S. Cl. .................... 345/88; 345/690; 345/204

(58) Field of Classification Search ........... 345/82–100, 345/427, 204, 690
See application file for complete search history.

(56) References Cited

U.S. PATENT DOCUMENTS 3,329,474 A   7/1967 Harris et al.
3,375,052 A   3/1968 Kosanke et al.
3,428,743 A   2/1969 Hanlon
3,439,348 A   4/1969 Harris et al.
3,499,700 A   3/1970 Harris et al.
3,503,670 A   3/1970 Kosanke et al.
3,554,632 A   1/1971 Chitayat
3,947,227 A   3/1976 Granger et al.
4,012,116 A   3/1977 Yevick
4,110,794 A   8/1978 Lester et al.
4,170,771 A   10/1979 Bly (Continued)

FOREIGN PATENT DOCUMENTS

EP    0 732 669 A1    9/1996

(Continued)

OTHER PUBLICATIONS

Youngshin Kwak and Lindsay W. MacDonald; *Accurate Prediction of Colours on Liquid Crystal Displays*; IS&T/SID Ninth Color Imaging Conference; pp. 355-359.

(Continued)

*Primary Examiner*—Bipin Shalwala
*Assistant Examiner*—Steven E Holton
(74) *Attorney, Agent, or Firm*—Chernoff, Vilhauer, McClung & Stenzel

(57) ABSTRACT

A system for modifying images to be shown on displays that have display characteristics dependant on the angle at which a displayed image is viewed. An image may be modified by detecting the position of a viewer relative to a display and based on the detected position, correcting the image.

20 Claims, 4 Drawing Sheets

U.S. PATENT DOCUMENTS

| | | |
|---|---|---|
| 4,187,519 A | 2/1980 | Vitols et al. |
| 4,384,336 A | 5/1983 | Frankle et al. |
| 4,385,806 A | 5/1983 | Fergason |
| 4,410,238 A | 10/1983 | Hanson |
| 4,441,791 A | 4/1984 | Hornbeck |
| 4,516,837 A | 5/1985 | Soref et al. |
| 4,540,243 A | 9/1985 | Fergason |
| 4,562,433 A | 12/1985 | Biferno |
| 4,574,364 A | 3/1986 | Tabata et al. |
| 4,611,889 A | 9/1986 | Buzak |
| 4,648,691 A | 3/1987 | Oguchi et al. |
| 4,649,425 A | 3/1987 | Pund |
| 4,682,270 A | 7/1987 | Whitehead et al. |
| RE32,521 E | 10/1987 | Fergason |
| 4,715,010 A | 12/1987 | Inoue et al. |
| 4,719,507 A | 1/1988 | Bos |
| 4,755,038 A | 7/1988 | Baker |
| 4,758,818 A | 7/1988 | Vatne |
| 4,766,430 A | 8/1988 | Gillette et al. |
| 4,834,500 A | 5/1989 | Hilsum et al. |
| 4,862,270 A | 8/1989 | Nishio |
| 4,862,496 A | 8/1989 | Kelly et al. |
| 4,885,783 A | 12/1989 | Whitehead et al. |
| 4,888,690 A | 12/1989 | Huber |
| 4,910,413 A | 3/1990 | Tamune |
| 4,917,452 A | 4/1990 | Liebowitz |
| 4,918,534 A | 4/1990 | Lam et al. |
| 4,933,754 A | 6/1990 | Reed et al. |
| 4,954,789 A | 9/1990 | Sampsell |
| 4,958,915 A | 9/1990 | Okada et al. |
| 4,969,717 A | 11/1990 | Mallinson |
| 4,981,838 A | 1/1991 | Whitehead |
| 4,991,924 A | 2/1991 | Shankar et al. |
| 5,012,274 A | 4/1991 | Dolgoff |
| 5,013,140 A | 5/1991 | Healey et al. |
| 5,074,647 A | 12/1991 | Fergason et al. |
| 5,075,789 A | 12/1991 | Jones et al. |
| 5,083,199 A | 1/1992 | Borner |
| 5,122,791 A | 6/1992 | Gibbons et al. |
| 5,128,782 A | 7/1992 | Wood |
| 5,138,449 A | 8/1992 | Kerpchar |
| 5,144,292 A | 9/1992 | Shiraishi et al. |
| 5,164,829 A | 11/1992 | Wada |
| 5,168,183 A | 12/1992 | Whitehead |
| 5,187,603 A | 2/1993 | Bos |
| 5,202,897 A | 4/1993 | Whitehead |
| 5,206,633 A | 4/1993 | Zalph |
| 5,214,758 A | 5/1993 | Ohba et al. |
| 5,222,209 A | 6/1993 | Murata et al. |
| 5,224,178 A | 6/1993 | Madden et al. |
| 5,247,366 A | 9/1993 | Ginosar et al. |
| 5,256,676 A | 10/1993 | Hider et al. |
| 5,293,258 A | 3/1994 | Dattilo |
| 5,300,942 A | 4/1994 | Dolgoff |
| 5,305,146 A | 4/1994 | Nakagaki et al. |
| 5,311,217 A | 5/1994 | Guerin et al. |
| 5,313,225 A | 5/1994 | Miyadera |
| 5,313,454 A | 5/1994 | Bustini et al. |
| 5,317,400 A | 5/1994 | Gurley et al. |
| 5,337,068 A | 8/1994 | Stewart et al. |
| 5,339,382 A | 8/1994 | Whitehead |
| 5,357,369 A | 10/1994 | Pilling et al. |
| 5,359,345 A | 10/1994 | Hunter |
| 5,369,266 A | 11/1994 | Nohda et al. |
| 5,369,432 A | 11/1994 | Kennedy |
| 5,386,253 A | 1/1995 | Fielding |
| 5,394,195 A | 2/1995 | Herman |
| 5,395,755 A | 3/1995 | Thorpe et al. |
| 5,416,496 A | 5/1995 | Wood |
| 5,422,680 A | 6/1995 | Lagoni et al. |
| 5,426,312 A | 6/1995 | Whitehead |
| 5,436,755 A | 7/1995 | Guerin |
| 5,450,498 A | 9/1995 | Whitehead |
| 5,456,255 A | 10/1995 | Abe et al. |
| 5,461,397 A | 10/1995 | Zhang et al. |
| 5,471,225 A | 11/1995 | Parks |
| 5,471,228 A | 11/1995 | Ilcisin et al. |
| 5,477,274 A | 12/1995 | Akiyoshi |
| 5,481,637 A | 1/1996 | Whitehead |
| 5,537,128 A | 7/1996 | Keene et al. |
| 5,570,210 A | 10/1996 | Yoshida et al. |
| 5,579,134 A | 11/1996 | Lengyel |
| 5,580,791 A | 12/1996 | Thorpe et al. |
| 5,592,193 A | 1/1997 | Chen |
| 5,617,112 A | 4/1997 | Yoshida et al. |
| 5,642,015 A | 6/1997 | Whitehead et al. |
| 5,642,128 A | 6/1997 | Inoue |
| D381,355 S | 7/1997 | Frank-Braun |
| 5,650,880 A | 7/1997 | Shuter et al. |
| 5,652,672 A | 7/1997 | Huignard et al. |
| 5,661,839 A | 8/1997 | Whitehead |
| 5,682,075 A | 10/1997 | Bolleman et al. |
| 5,684,354 A | 11/1997 | Gleckman |
| 5,689,283 A | 11/1997 | Shirochi |
| 5,715,347 A | 2/1998 | Whitehead |
| 5,717,421 A | 2/1998 | Katakura et al. |
| 5,717,422 A | 2/1998 | Fergason |
| 5,729,242 A | 3/1998 | Margerum et al. |
| 5,748,164 A | 5/1998 | Handschy et al. |
| 5,751,264 A | 5/1998 | Cavallerano et al. |
| 5,754,159 A | 5/1998 | Wood et al. |
| 5,767,828 A | 6/1998 | McKnight |
| 5,767,837 A | 6/1998 | Hara |
| 5,774,599 A | 6/1998 | Muka et al. |
| 5,784,181 A | 7/1998 | Loiseaux et al. |
| 5,796,382 A | 8/1998 | Beeteson |
| 5,809,169 A | 9/1998 | Rezzouk et al. |
| 5,854,662 A | 12/1998 | Yuyama et al. |
| 5,886,681 A | 3/1999 | Walsh et al. |
| 5,889,567 A | 3/1999 | Swanson et al. |
| 5,892,325 A | 4/1999 | Gleckman |
| 5,901,266 A | 5/1999 | Whitehead |
| 5,912,651 A | 6/1999 | Bitzakidis et al. |
| 5,939,830 A | 8/1999 | Praiswater |
| 5,940,057 A | 8/1999 | Lien et al. |
| 5,959,777 A | 9/1999 | Whitehead |
| 5,969,704 A | 10/1999 | Green et al. |
| 5,978,142 A | 11/1999 | Blackham et al. |
| 5,986,628 A | 11/1999 | Tuenge et al. |
| 5,991,456 A | 11/1999 | Rahman et al. |
| 5,995,070 A | 11/1999 | Kitada |
| 5,999,307 A | 12/1999 | Whitehead et al. |
| 6,008,929 A | 12/1999 | Akimoto et al. |
| 6,024,462 A | 2/2000 | Whitehead |
| 6,025,583 A | 2/2000 | Whitehead |
| 6,043,591 A | 3/2000 | Gleckman |
| 6,050,704 A | 4/2000 | Park |
| 6,064,784 A | 5/2000 | Whitehead et al. |
| 6,067,645 A | 5/2000 | Yamamoto et al. |
| 6,079,844 A | 6/2000 | Whitehead et al. |
| 6,111,559 A | 8/2000 | Motomura et al. |
| 6,111,622 A | 8/2000 | Abileah |
| 6,120,588 A | 9/2000 | Jacobson |
| 6,120,839 A | 9/2000 | Comiskey et al. |
| 6,129,444 A | 10/2000 | Tognoni |
| 6,160,595 A | 12/2000 | Kishimoto |
| 6,172,798 B1 | 1/2001 | Albert et al. |
| 6,211,851 B1 | 4/2001 | Lien et al. |
| 6,215,920 B1 | 4/2001 | Whitehead et al. |
| 6,232,948 B1 | 5/2001 | Tsuchi |
| 6,243,068 B1 | 6/2001 | Evanicky et al. |
| 6,267,850 B1 | 7/2001 | Bailey et al. |
| 6,268,843 B1 | 7/2001 | Arakawa |
| 6,276,801 B1 | 8/2001 | Fielding |

| | | |
|---|---|---|
| 6,300,931 B1 | 10/2001 | Someya et al. |
| 6,300,932 B1 | 10/2001 | Albert |
| 6,304,365 B1 | 10/2001 | Whitehead |
| 6,323,455 B1 | 11/2001 | Bailey et al. |
| 6,323,989 B1 | 11/2001 | Jacobsen et al. |
| 6,327,072 B1 | 12/2001 | Comiskey et al. |
| RE37,594 E | 3/2002 | Whitehead |
| 6,359,662 B1 | 3/2002 | Walker |
| 6,377,383 B1 | 4/2002 | Whitehead et al. |
| 6,384,979 B1 | 5/2002 | Whitehead et al. |
| 6,400,436 B1 | 6/2002 | Komatsu |
| 6,414,664 B1 | 7/2002 | Conover et al. |
| 6,418,253 B2 | 7/2002 | Whitehead |
| 6,424,369 B1 | 7/2002 | Adair et al. |
| 6,428,189 B1 | 8/2002 | Hochstein |
| 6,435,654 B1 | 8/2002 | Wang |
| 6,437,921 B1 | 8/2002 | Whitehead |
| 6,439,731 B1 | 8/2002 | Johnson et al. |
| 6,448,944 B2 | 9/2002 | Ronzani et al. |
| 6,448,951 B1 | 9/2002 | Sakaguchi et al. |
| 6,448,955 B1 | 9/2002 | Evanicky et al. |
| 6,452,734 B1 | 9/2002 | Whitehead et al. |
| 6,483,643 B1 | 11/2002 | Zuchowski |
| 6,507,327 B1 | 1/2003 | Atherton et al. |
| 6,545,677 B2 | 4/2003 | Brown |
| 6,559,827 B1 | 5/2003 | Mangerson |
| 6,573,928 B1 | 6/2003 | Jones et al. |
| 6,574,025 B2 | 6/2003 | Whitehead et al. |
| 6,590,561 B1 | 7/2003 | Kabel et al. |
| 6,597,339 B1 | 7/2003 | Ogawa |
| 6,608,614 B1 | 8/2003 | Johnson |
| 6,624,828 B1 * | 9/2003 | Dresevic et al. ............ 715/771 |
| 6,657,607 B1 | 12/2003 | Evanicky et al. |
| 6,680,834 B2 | 1/2004 | Williams |
| 6,690,383 B1 | 2/2004 | Braudaway et al. |
| 6,697,110 B1 | 2/2004 | Jaspers et al. |
| 6,700,559 B1 | 3/2004 | Tanaka et al. |
| 6,753,876 B2 | 6/2004 | Brooksby et al. |
| 6,788,280 B2 | 9/2004 | Ham |
| 6,791,520 B2 | 9/2004 | Choi |
| 6,803,901 B1 | 10/2004 | Numao |
| 6,816,141 B1 | 11/2004 | Fergason |
| 6,816,142 B2 | 11/2004 | Oda et al. |
| 6,816,262 B1 | 11/2004 | Slocum et al. |
| 6,828,816 B2 | 12/2004 | Ham |
| 6,834,125 B2 | 12/2004 | Woodell et al. |
| 6,846,098 B2 | 1/2005 | Bourdelais et al. |
| 6,856,449 B2 | 2/2005 | Winkler et al. |
| 6,862,012 B1 * | 3/2005 | Funakoshi et al. ............ 345/88 |
| 6,864,916 B1 | 3/2005 | Nayar et al. |
| 6,885,369 B2 | 4/2005 | Tanahashi et al. |
| 6,891,672 B2 | 5/2005 | Whitehead et al. |
| 6,900,796 B2 | 5/2005 | Yasunishi et al. |
| 6,932,477 B2 | 8/2005 | Stanton |
| 6,954,193 B1 * | 10/2005 | Andrade et al. ............... 345/90 |
| 6,975,369 B1 | 12/2005 | Burkholder |
| 7,002,546 B1 | 2/2006 | Stuppi et al. |
| 7,113,163 B2 | 9/2006 | Nitta et al. |
| 7,113,164 B1 | 9/2006 | Kurihara |
| 7,123,222 B2 | 10/2006 | Borel et al. |
| 7,161,577 B2 | 1/2007 | Hirakata et al. |
| 2001/0005192 A1 | 6/2001 | Walton et al. |
| 2001/0013854 A1 | 8/2001 | Ogoro |
| 2001/0024199 A1 | 9/2001 | Hughes et al. |
| 2001/0035853 A1 | 11/2001 | Hoelen et al. |
| 2001/0038736 A1 | 11/2001 | Whitehead |
| 2001/0048407 A1 | 12/2001 | Yasunishi et al. |
| 2001/0052897 A1 | 12/2001 | Nakano et al. |
| 2002/0003520 A1 | 1/2002 | Aoki |
| 2002/0003522 A1 | 1/2002 | Baba et al. |
| 2002/0008694 A1 | 1/2002 | Miyachi et al. |
| 2002/0033783 A1 | 3/2002 | Koyama |
| 2002/0036650 A1 | 3/2002 | Kasahara et al. |
| 2002/0044116 A1 | 4/2002 | Tagawa et al. |
| 2002/0057238 A1 | 5/2002 | Nitta et al. |
| 2002/0057253 A1 | 5/2002 | Lim et al. |
| 2002/0063963 A1 | 5/2002 | Whitehead et al. |
| 2002/0067325 A1 | 6/2002 | Choi |
| 2002/0067332 A1 | 6/2002 | Hirakata et al. |
| 2002/0070914 A1 | 6/2002 | Bruning et al. |
| 2002/0093521 A1 | 7/2002 | Daly et al. |
| 2002/0105709 A1 | 8/2002 | Whitehead et al. |
| 2002/0135553 A1 | 9/2002 | Nagai et al. |
| 2002/0149574 A1 | 10/2002 | Johnson et al. |
| 2002/0149575 A1 * | 10/2002 | Moon ........................ 345/204 |
| 2002/0154088 A1 | 10/2002 | Nishimura |
| 2002/0159002 A1 | 10/2002 | Chang |
| 2002/0159692 A1 | 10/2002 | Whitehead |
| 2002/0162256 A1 | 11/2002 | Wardle et al. |
| 2002/0171617 A1 | 11/2002 | Fuller |
| 2002/0175907 A1 | 11/2002 | Sekiya et al. |
| 2002/0180733 A1 * | 12/2002 | Colmenarez et al. ........ 345/427 |
| 2002/0190940 A1 | 12/2002 | Itoh et al. |
| 2003/0012448 A1 | 1/2003 | Kimmel et al. |
| 2003/0026494 A1 | 2/2003 | Woodell et al. |
| 2003/0043394 A1 | 3/2003 | Kuwata et al. |
| 2003/0048393 A1 | 3/2003 | Sayag |
| 2003/0053689 A1 | 3/2003 | Watanabe et al. |
| 2003/0072496 A1 | 4/2003 | Woodell et al. |
| 2003/0090455 A1 | 5/2003 | Daly |
| 2003/0107538 A1 | 6/2003 | Asao et al. |
| 2003/0108245 A1 | 6/2003 | Gallagher et al. |
| 2003/0112391 A1 | 6/2003 | Jang et al. |
| 2003/0128337 A1 | 7/2003 | Jaynes et al. |
| 2003/0132905 A1 | 7/2003 | Lee et al. |
| 2003/0142118 A1 | 7/2003 | Funamoto et al. |
| 2003/0169247 A1 | 9/2003 | Kawabe et al. |
| 2003/0179221 A1 | 9/2003 | Nitta et al. |
| 2003/0197709 A1 | 10/2003 | Shimazaki et al. |
| 2004/0012551 A1 | 1/2004 | Ishii |
| 2004/0041782 A1 | 3/2004 | Tachibana |
| 2004/0051724 A1 | 3/2004 | Elliott et al. |
| 2004/0057017 A1 | 3/2004 | Childers et al. |
| 2004/0239587 A1 | 12/2004 | Murata et al. |
| 2004/0263450 A1 | 12/2004 | Lee et al. |
| 2005/0073495 A1 | 4/2005 | Harbers et al. |
| 2005/0088403 A1 | 4/2005 | Yamazaki |
| 2005/0157298 A1 | 7/2005 | Evanicky et al. |
| 2005/0190164 A1 | 9/2005 | Velthoven et al. |
| 2005/0200295 A1 | 9/2005 | Lim et al. |
| 2005/0225561 A1 | 10/2005 | Higgins et al. |
| 2005/0225574 A1 | 10/2005 | Brown et al. |
| 2005/0259064 A1 | 11/2005 | Sugino et al. |
| 2006/0071936 A1 | 4/2006 | Leyvi et al. |
| 2006/0104508 A1 | 5/2006 | Daly et al. |
| 2006/0120598 A1 | 6/2006 | Takahashi et al. |
| 2006/0208998 A1 | 9/2006 | Okishiro et al. |
| 2007/0052636 A1 | 3/2007 | Kalt et al. |
| 2008/0025634 A1 | 1/2008 | Border et al. |
| 2008/0088560 A1 | 4/2008 | Bae et al. |

FOREIGN PATENT DOCUMENTS

| | | |
|---|---|---|
| EP | 0 829 747 A1 | 3/1998 |
| EP | 0 606 162 B1 | 11/1998 |
| EP | 0912047 | 4/1999 |
| EP | 0 963 112 A1 | 12/1999 |
| EP | 1168243 | 1/2002 |
| EP | 1 202 244 A1 | 5/2002 |
| EP | 1 206 130 A1 | 5/2002 |
| EP | 1 313 066 A1 | 5/2003 |
| EP | 1 316 919 A2 | 6/2003 |
| EP | 1 453 002 | 9/2004 |
| EP | 1 453 030 A1 | 9/2004 |
| FR | 2 611 389 | 2/1987 |
| GB | 2 388 737 | 11/2003 |

| | | |
|---|---|---|
| JP | 64-10299 | 1/1989 |
| JP | 1-98383 | 4/1989 |
| JP | 3-71111 | 3/1991 |
| JP | 3-198026 | 8/1991 |
| JP | 5-66501 | 3/1993 |
| JP | 5-80716 | 4/1993 |
| JP | 5-273523 | 10/1993 |
| JP | 5-289044 | 11/1993 |
| JP | 6-247623 | 9/1994 |
| JP | 6-313018 | 11/1994 |
| JP | 7-121120 | 5/1995 |
| JP | 9-244548 | 9/1997 |
| JP | 10-508120 | 8/1998 |
| JP | 11-052412 | 2/1999 |
| JP | 2002-099250 | 4/2000 |
| JP | 2000-206488 | 7/2000 |
| JP | 2000-275995 | 10/2000 |
| JP | 2000-321571 | 11/2000 |
| JP | 2001-142409 | 5/2001 |
| JP | 2002-091385 | 3/2002 |
| JP | 2003-204450 | 7/2003 |
| JP | 2003-230010 | 8/2003 |
| JP | 3523170 | 2/2004 |
| JP | 2004-294540 | 10/2004 |
| KR | 10-2004-0084777 | 10/2004 |
| TW | 406206 | 3/1998 |
| WO | WO 91/15843 | 10/1991 |
| WO | PCT/US93/00660 | 10/1993 |
| WO | WO 93/20660 | 10/1993 |
| WO | WO 96/33483 | 10/1996 |
| WO | WO 98/08134 | 2/1998 |
| WO | WO 00/75720 | 12/2000 |
| WO | WO 01/69584 | 9/2001 |
| WO | WO 02/03687 | 1/2002 |
| WO | WO 02/079862 | 10/2002 |
| WO | WO 03/077013 | 9/2003 |
| WO | WO 2004/013835 | 2/2004 |

OTHER PUBLICATIONS

Paul E. Debevec and Jitendra Malik, "Recovering High Dynamic Range Radiance Maps from Photographs," Proceedings of SIGGRAPH 97, Computer Graphics Proceedings, Annual Conference Series, pp. 369-378 (Aug. 1997, Los Angeles, California). Addison Wesley, Edited by Turner Whitted. ISBN 0-89791-896-7.
Dicarlo, J.M. and Wandell, B. (2000), "Rendering high dynamic range images," in Proc. IS&T/SPIE Electronic Imaging 2000. Image Sensors, vol. 3965, San Jose, CA, pp. 392-401.
Kuang, J., Yamaguchi, H., Johnson, G.M. and Fairchild, M.D. (2004), "Testing HDR image rendering algorithms (Abstract)," in Proc. IS&T/SID Twelfth Color Imaging Conference: Color Science, Systems, and Application, Scottsdale, AR, pp. 315-320.
Durand, F. and Dorsey, J. (2002), "Fast bilateral filtering for the display of high dynamic-range images," in Proc. ACM SIGGRAPH 2002, Annual Conference on Computer Graphics, San Antonia, CA, pp. 257-266.
Kang, S.B., Uyttendaele, M., Winder, S. and Szeliski, R. (2003), "High Dynamic Range Video," ACM Transactions on Graphics 22(3), 319-325.
Brian A. Wandell and Louis D. Silverstein, "The Science of Color," 2003, Elsevier Ltd, Ch. 8 Digital Color Reproduction, pp. 281-316.
Fumiaki Yamada and Yoichi Taira, "An LED backlight for color LCD," IBM Research, Tokyo Research Laboratory, 1623-14, Shimotsuruma, Yamato, Kanagawa-ken 242-8502, Japan, IDW'00, pp. 363-366.
A.A.S. Sluyterman and E.P. Boonekamp, "18.2: Architectural Choices in a Scanning Backlight for Large LCD TVs," Philips Lighting, Bld. HBX-p, PO Box 80020, 5600 JM Eindhoven, The Netherlands, SID 05 Digest, pp. 996-999.
Fumiaki Yamada, Hajime Nakamura, Yoshitami Sakaguchi, and Yoichi Taira, "52.2: Invited Paper: Color Sequential LCD Based on OCB with an LED Backlight," Tokyo Research Laboratory, IBM Research, Yamato, Kanagawa, Japan, SID 00 Digest, pp. 1180-1183.
Ngai-Man Cheung, et al., "Configurable entropy coding scheme for H.26L," ITU-Telecommunications Standardization Sector, Study Group 16 Question 6 Video Coding Experts Group (VCEG), Twelfth Meeting: Eibsee, Germany, Jan. 9-12, 2001, pp. 1-11.
T. Funamoto, T. Kobayashi, T. Murao, "High-Picture-Quality Technique for LCD televisions: LCD-AI," AVC Products Development Center, Matsushita Electric Industrial, Co., Ltd., 1-1 Matsushita-cho, Ibaraki, Osaka 567-0026 Japan, 2 pages, date unknown.
Steven L Wright, et al., "Measurement and Digital compensation of Crosstalk and Photoleakage in High-Resolution TFTLCDs," IBM T.J. Watson Research Center, PO Box 218 MS 10-212, Yorktown Heights, NY 10598, pp. 1-12, date unknown.

* cited by examiner

LIQUID CRYSTAL DISPLAY WITH ADAPTIVE COLOR

This application claims the benefit of U.S. Patent Application Ser. No. 60/524,321 filed Nov. 21, 2003 entitled METHOD AND SYSTEM FOR ADAPTIVE DISPLAY COLOR CORRECTION BASED ON AUTOMATIC VIEWING ANGLE ESTIMATION IN REAL TIME.

BACKGROUND OF THE INVENTION

This application relates to displays with adaptive color.

Liquid crystal displays tend to exhibit a color dependency based upon the viewing angle between the viewer and the display. Liquid crystal displays are typically designed to exhibit the desired colors when viewed at a normal viewing angle (directly in front) to the display. When a viewer views an image on a display at a significant off-normal viewing angle, the colors tend to shift from those observed at a normal viewing direction, the contrast of the image tends to reverse, and the gamma characteristics degrade.

The primary techniques employed to improve non-normal viewing angle characteristics may be categorized into two major classes. The first class of techniques include those that focus on physical modification of the liquid crystal display and modification of the manufacturing processes of making the liquid crystal display. The second class of techniques include those that pre-process the image in a particular manner such that the signals provided to the liquid crystal display are modified so that when the image is viewed from an off-axis angle it is shifted toward what would be expected at a normal viewing angle. The pre-processing may include modifying the pixel image data or modifying the display driver data.

DETAILED DESCRIPTION OF THE PREFERRED EMBODIMENTS

Figure 1:
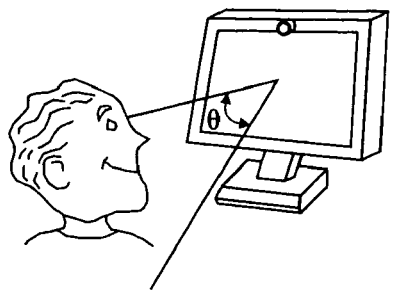
FIG. 1 illustrates a display and a viewer.

The present inventors considered existing image processing techniques and determined that the results of such techniques could be significantly improved if the system had information regarding the actual location of the viewer in relation to the display. Referring to FIG. 1, the location information should provide an indication of the angular relationship that the viewer is viewing the surface of the image on the display in relation to an angle normal to the surface of the display. The angular relationship may be determined by processing data from a camera or other imaging device associated with the display. The image data is then modified in accordance with the angular relationship information.

Figure 2:
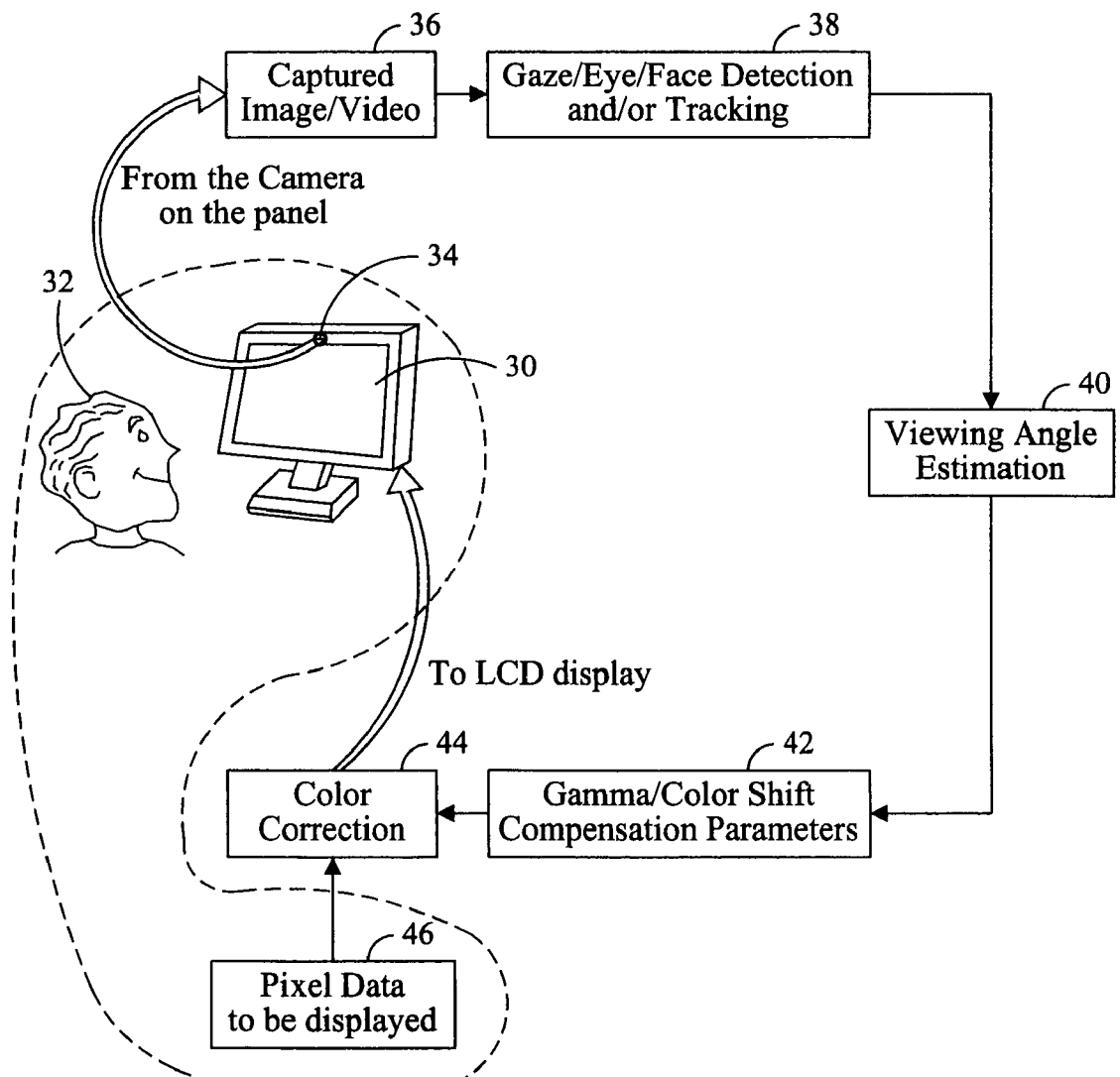
FIG. 2 illustrates a image modification system.

Referring to FIG. 2, another embodiment includes a liquid crystal display 30 that presents an image thereon. A viewer 32 views the image on the display 30 and an imaging device 34 affixed to the display 30 captures an image or video that includes the viewer 32. Typically, the angular relationship between the imaging device and the display is known. The captured image or video 36 obtained from the imaging device 34 are provided to a detection and/or tracking module 38. The module 38 detects the facial region of the viewer 32, detects the eyes of the viewer 32, and/or obtains gaze information where the viewer 32 is looking. Based upon the information from the module 38 the viewing angle between the viewer 32 and a portion of the display 30 is determined at module 40. Based upon the viewing angle of the viewer 32, compensation parameters are determined at module 42 to adjust the color of the image to be viewed by the viewer 32. An image is normally formatted for the display in the form of pixel data from a source 46, such as a computer, a television signal, a digital-video-disc, or a video-cassette-recorder. The pixel data from the source 46 is modified by a color correction module 44 that also receives compensation parameters from module 42 in order to modify the image data to be observed by the viewer 32. The image data is modified so that on average the viewer observes an image that is closer to presenting the colors that would be viewed at a normal viewing angle than what would have been otherwise viewed at the off-axis viewing angle.

Figure 3A:
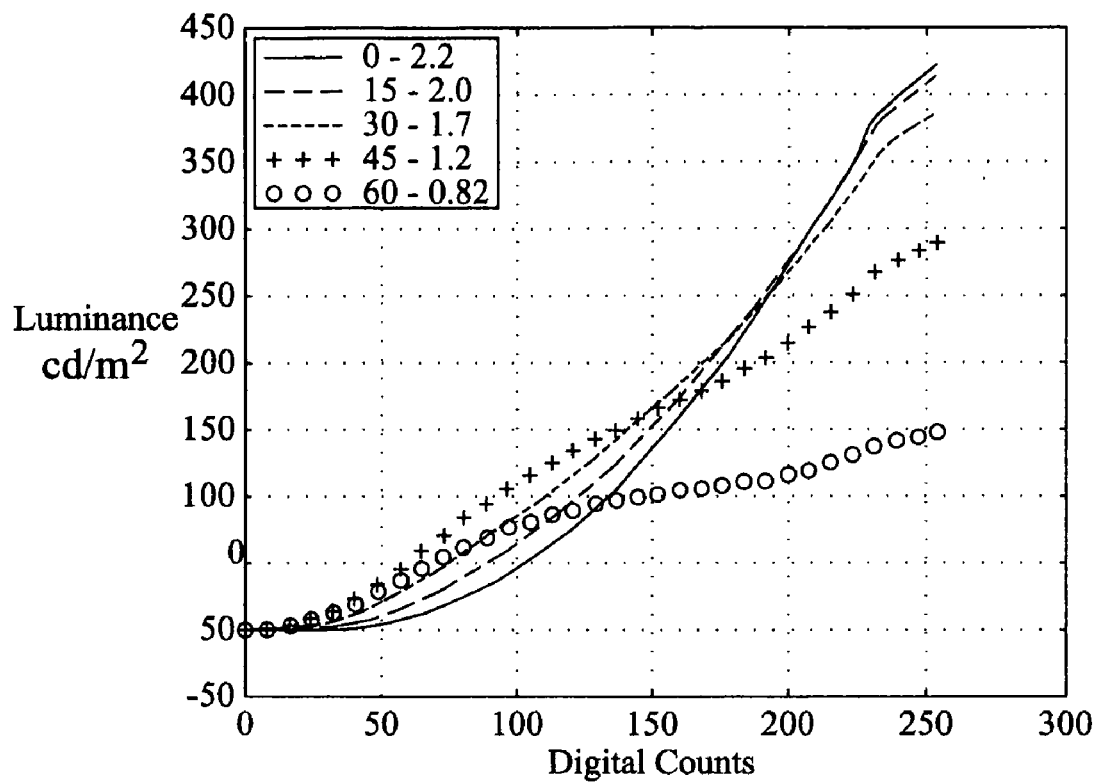
FIG. 3 illustrates color and white point shifts.
Figure 3B:
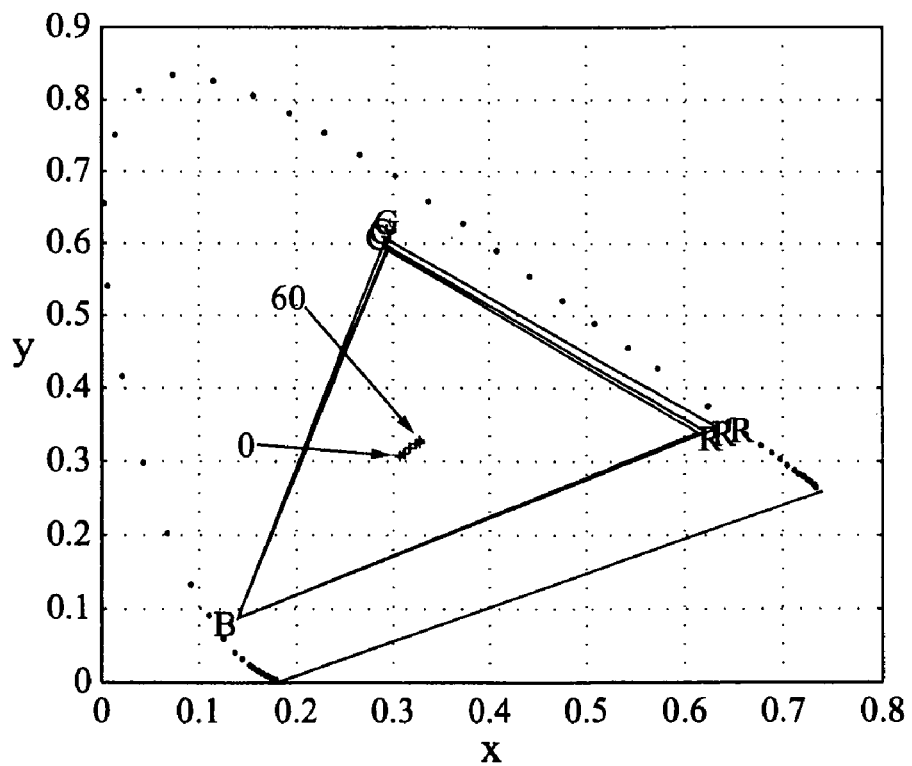

An illustration of how changes in the viewing angles results in tone-scale variations is illustrated in FIG. 3. In FIG. 3, a single gamma parameter is used to approximate the resulting variations for a given viewing angle. FIG. 3A illustrates measured tone-scale variations and computed gamma values at five different viewing angles, ranging from 0 degrees (normal to the display) to 60 degrees off normal. It may be observed that the viewing angle induced tone-scale variations in the image are dramatic. Specifically, the gamma of the displayed image is subject to dramatic change (from 2.2 to 0.82 in FIG. 3A) when the viewing angle changes from 0 degrees to 60 degrees. In fact, when the viewing angle tends to get larger, a single gamma characteristic is not especially suitable to characterize the color distortion of the viewed image, and thus a multi-segment gamma or a look-up-table should be used. Referring to FIG. 3B, it also was determined that the white-point tends to shift towards yellow as the viewing angle increases. Based upon these observations the image processing technique and hence the modifications of the pixel values may take into account the effects resulting from tone-scale variations, or white-point shifts, or both. In some cases, a single value may be used to characterize the entire curve, or otherwise multiple values may be used to characterize the entire curve.

Preferably, the imaging device is mounted to the display with a fixed or known orientation, with the imaging device constantly capturing the environment in front of the display, including any viewer(s). Although the projection of a physical point on the image may vary if the camera is moving, since the camera is maintained in a fixed orientation with respect to the display, every physical point in the field view of the camera should correspond to a fixed location in the image at any given time. Therefore, the camera may detect in the acquired image the locations of the viewer's eyes, and then the system may effectively estimate the viewing angle under given image capture device characteristics. Some image device characteristics include the focal length, image resolution, pixel size, etc.

The system may determine the viewer's gaze direction in order to more accurately determine the angle between the eye and the portion of the display being viewed. In some cases, the viewer may be viewing the left side of the display which may have a different angle than the right hand side of the display. In such a case, the pixel data modification may be modified in relation to that region of the display being viewed.

The system may determine the location of a portion of the viewer, such as the viewer's eyes, and determine the viewing angle with respect to one or more regions of the display. The regions of the display may be any suitable portion of the display, multiple portions of the display, or otherwise the central portion of the display.

The system may detect the facial region of the viewer and use the facial region of the viewer to determine a viewing angle with respect to a portion of the display. The portion of the display may be any suitable portion(s) of the display, or otherwise the central portion of the display. In some cases, the system may detect the facial region and then estimate the portion of the image where the eye(s) should be located, and then use the eye region.

Figure 4:
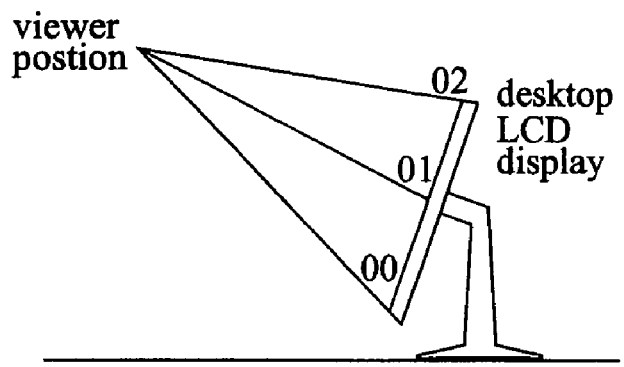
FIG. 4 illustrates a display and viewer position.

The system may use any suitable imaging mechanism, such as a gaze detector, an eye detector, a face detector, or an eye estimator. Referring to FIG. 4, when the dimensions of a display are large compared with the distance between the viewer and the display (which is typically the case in the situation of a computer monitor); a single viewing angle does not tend to accurately characterize the viewer's viewing direction for all areas of the display. This is primarily because different regions of the display have significantly different viewing angles even when a viewer's position is fixed. Thus, the top part of the display, the central part of the display, the right hand part of the display, the left hand part of the display, and the bottom part of the display correspond to different viewing angles. In addition, there are changes due to the viewing angle variations in diagonal directions.

On the other hand, when the dimensions of a display are relatively small compared with the distance between the viewer and the display (which is typically the case in the situation of a liquid crystal display being used as a television or a handheld device that includes a small liquid crystal display, a single viewing angle may be adequate to characterize the viewing direction for all regions of the display. Since the viewing angle only varies slightly for different areas of the display.

Figure 5:
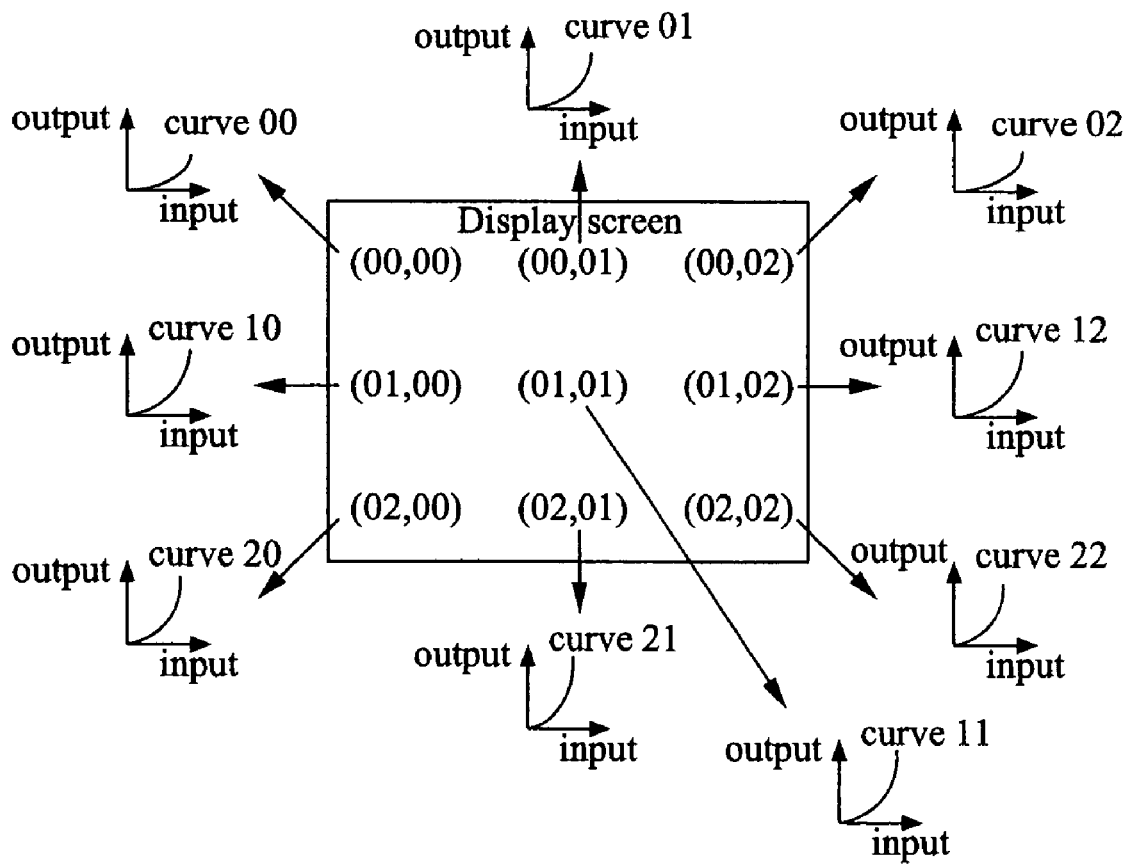
FIG. 5 illustrates a display with multiple regions.

In the case that the viewer is sufficiently far from the display in relation to its size, a suitable measure for a viewing angle is from the face or eye to the center of the display. In contract, assuming that the display is not sufficiently far from the viewer in relation to its size, then a plurality of different measures of the viewing angle should be used. For example, nine different gammas for nine different sub-regions may be used, as illustrated in FIG. 5. The gamma curves may be dynamically determined based upon the viewer's current location with respect to the display. In addition, the different regions of the display may be computed based upon an estimation of the normal size of the face and hence the spacing of the eyes, or otherwise based upon a determination of the location of the eyes. In this manner, the distances from the right eye and/or left eye may be taken into account to determine the viewing angles.

While the color correction modification may be based upon a single viewer, in some cases multiple viewers will be viewing the same display. Multiple viewers may be accommodated in several ways, such as for example, one or more of the following:

First, if more than two viewers are detected, the color correction may be done according to the primary viewer's viewing angle where the primary viewer may be determined, for example, by the largest size of the detected face/eyes. This determination is based upon the size normally corresponding to the distance of the viewer from the display.

Second, if two viewers are detected and they are approximately symmetric with respect to the center of the display, then the viewing angle may be set to that of either of the viewers and the other viewer will perceive the same compensation due to the symmetry in the viewing angle characteristics of the display.

Third, if two viewers are detected and they are not approximately symmetric with respect to the center of the display, then the viewing angle may be set to a statistical measure of the two viewing angles so that the two viewers will view similar quality images. Averaging is the preferred statistical measure since from FIG. 3 one may observe that, for example, the gamma changes monotonically with the viewing angle.

For techniques two and three, it may be observed that the two viewers are about the same distance from the display and that both are relatively far from the display, otherwise it is preferable to use the first technique. In addition, the system may include a mode that permits the color correction module to be disabled under some circumstances, such as when more than two viewers are detected but without a primary viewer being determined so that the display may use the default setting.

In some embodiments, the system may use multiple cameras, such as a pair of stereo cameras, so that the distance between the display and the viewer may be readily calculated. For example, when the display size is relatively large in comparison with the distance between a viewer and the display, then accurate determination of the viewing angle with respect to each sub-region of the display can be determined, which may be obtained based on the viewer-to-display distance computed through the images from a pair of stereo cameras.

Figure 6:
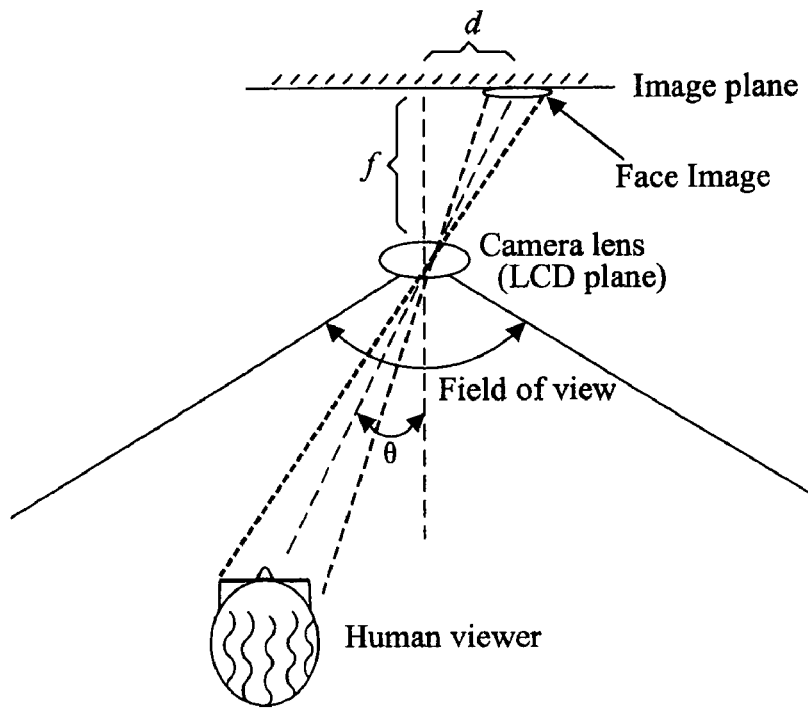
FIG. 6 illustrates a viewer and a camera lens.

Any suitable face, eye, gaze detection technique (or otherwise) may be used. For simplicity, it may be assumed that the camera is located in the center of an LCD display (in practice, since the camera cannot be placed in the center of a display, one may compensate for the camera position when computing the viewing angle from the captured image or video) with a simple pin-hole camera model (which may characterize most inexpensive consumer cameras). FIG. 6 illustrates the relationship between a face image and the angle, which is the angle between the optical axis of the camera lens and the viewer's viewing direction (this is also the viewing angle with respect to the center of the display under the above assumption of the camera location. When the camera is located elsewhere, after an angle is computed, the system can determine the actual viewing angle with respect to the display.

For simplicity, it may be assumed that the camera is located in the center of the LCD display. As illustrated in FIG. 6, since the face image is located on the right-hand side of the image plane, it is determined that the user's face (and thus eyes) is located in the left-hand side of the image. In this particular example, since it was assumed that the camera is located in the center of the LCD, the system may determine that the viewer is watching the LCD from left-hand side with a viewing angle (with respect to the center of the display)

$$\theta = \operatorname{Arctan}(d/f)$$

Where f is the focal length, and d is distance between the image center and the center of the eyes (d may be computed from the image resolution and pixel size of the camera). Notice that although FIG. 6 illustrates a graph for the horizontal viewing angle, the same technique likewise applies to the vertical viewing angle.

With the viewing angle estimated, and with the measured LCD viewing angle characteristics (such as those shown in FIG. 3), color correction is achieved by preprocessing the pixel data before displaying.

With a look-up-table computed based on the measured tone-scale variations, color correction can be preformed through transforming each pixel of an image using the table. In a simple case, gamma compensation is done to bring the gamma of the viewed image at a certain angle to the normal range (e.g. ~2.2). For example, in the case of FIG. 3(a), when the system detects the user is viewing the LCD from a 45° angle, the pixel data is compensated by a gamma of 1.83 (=2.2/1.2) so that the ultimate image exhibits a normal gamma of 2.2 to the viewer at that angle.

Figure 7:
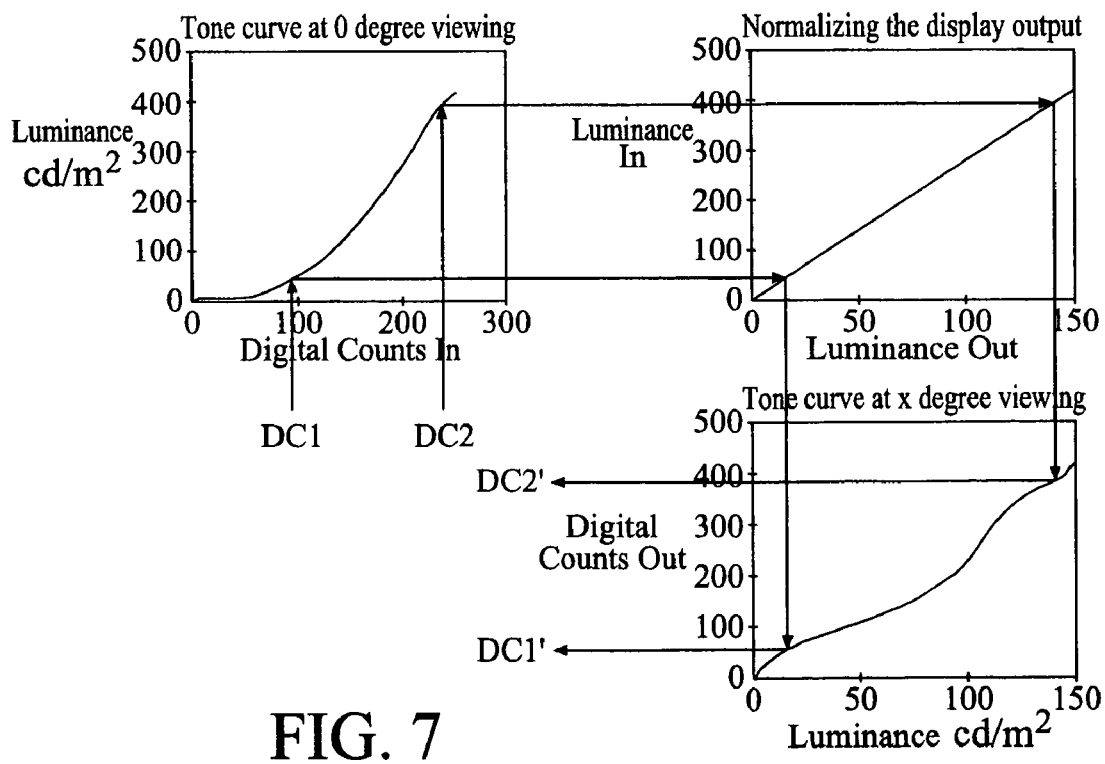
FIG. 7 illustrates image modification.

As discussed earlier, instead of using a single gamma, the system may use the measured curves in FIG. 3(a) directly in compensating the tone-scale variation. FIG. 7 illustrates the process for tone scale correction using the measured tone curves. The input digital counts are converted to output luminance using the display tone curve at normal viewing condition (0 degrees) as shown in the up left sub plot. Since the overall luminance tends to fall off as viewing angle increases, the max input luminance (0 degrees) is normalized to the max output luminance at the target view angle (x). The same normalization should be done for the minimum luminance to make sure the target luminance is within the output range of the display at the target angle. The upper right plot shows the luminance normalization. The lower left curve shows the tone response of the display at the target angle. The desired digital counts may be looked-up from the three curves.

The arrows in FIG. 7 show how the digital counts (DC1 and DC2) are corrected via three lookup tables so that they can be displayed correctly at the target viewing angles (x). In some implementations, these three tables can be collapsed to just one table to reduce the computation.

Another type of correction is the compensation of the white-point shift caused by the shift in the primaries (or color shift in general). The color primaries are measured as shown in FIG. 3(b) for both the preferred viewing angle (O degree) and the currently detected viewing angle (x). Two color conversion matrixes can be derived to convert RGB signal to normalized XYX:

$$\begin{bmatrix} \overline{X_0} \\ \overline{Y_0} \\ \overline{Z_0} \end{bmatrix} = \frac{1}{Y_{r0} + Y_{g0} + Y_{b0}} \begin{bmatrix} X_{r0} & X_{g0} & X_{b0} \\ Y_{r0} & Y_{g0} & Y_{b0} \\ Z_{r0} & Z_{g0} & Z_{b0} \end{bmatrix} \begin{bmatrix} R_0 \\ G_0 \\ B_0 \end{bmatrix}$$

$$\begin{bmatrix} \overline{X_x} \\ \overline{Y_x} \\ \overline{Z_x} \end{bmatrix} = \frac{1}{Y_{rx} + Y_{gx} + Y_{bx}} \begin{bmatrix} X_{rx} & X_{gx} & X_{bx} \\ Y_{rx} & Y_{gx} & Y_{bx} \\ Z_{rx} & Z_{gx} & Z_{bx} \end{bmatrix} \begin{bmatrix} R_x \\ G_x \\ B_x \end{bmatrix}$$

In order to have the same color at other viewing angles, the normalized XYZ should be equal, resulting in a single 3×3 matrix to convert RGB value of preferred viewing angle (θ) to the detected viewing angle (x) as:

$$\begin{bmatrix} R_x \\ G_x \\ B_x \end{bmatrix} = \frac{Y_{rx} + Y_{gx} + Y_{bx}}{Y_{r0} + Y_{g0} + Y_{b0}} \begin{bmatrix} X_{rx} & X_{gx} & X_{bx} \\ Y_{rx} & Y_{gx} & Y_{bx} \\ Z_{rx} & Z_{gx} & Z_{bx} \end{bmatrix}^{-1} \begin{bmatrix} X_{r0} & X_{g0} & X_{b0} \\ Y_{r0} & Y_{g0} & Y_{b0} \\ Z_{r0} & Z_{g0} & Z_{b0} \end{bmatrix} \begin{bmatrix} R_0 \\ G_0 \\ B_0 \end{bmatrix}$$

This conversion may be done in the gamma correction RGB domain. The color shift correction may be combined with the tone scale correction as shown in FIG. 7. This 3×3 correction may be applied either before the normalization or after the normalization. In some cases, multiple imaging devices may be used.

In some cases, multiple displays may be used and thus the viewing angle constantly changes for each display when the viewer checks back and forth of the individual monitors.

In yet another embodiment, ambient light characteristics can be estimated with the image/video captured by the camera so that color correction can be performed for ambient light in addition to viewing angle.

What is claimed is:

1. A method of modifying an image to be displayed on a display that has viewing angle dependant image characteristics comprising:
   (a) receiving said image;
   (b) determining automatically, without user interaction, the respective locations of a viewer, each relative to one of an automatically determined number of regions into which said display is subdivided, each said location including both a distance from the respectively associated said region of said display and an angle of incidence with respect to the respectively associated said regions of said display, where automated determination of said number of regions is based on criteria selected as a function of the determined said distance relative to the size of said display;
   (c) modifying said image based upon said respective locations in such a manner that at least one of the gamma and the white point viewed by said viewer are on average shifted toward at least one of the gamma and the white point said viewer would observe at a normal viewing angle of said display.

2. The method of claim 1 wherein said modification is based upon said gamma.

3. The method of claim 1 wherein said modification is based upon said white point.

4. The method of claim 1 wherein said location of said viewer is an angular relationship between said display and the location of said viewer.

5. The method of claim 1 wherein said display is a liquid crystal display.

6. The method of claim 1 wherein said determining said location is based upon an image received by an imaging device.

7. The method of claim 6 wherein said imaging device is a camera.

8. The method of claim 6 wherein the angular relationship between said imaging device and said display is known.

9. The method of claim 8 wherein said angular relationship is normal.

10. The method of claim 6 wherein said location is based upon face detection.

11. The method of claim 6 wherein said location is based upon eye detection.

12. The method of claim 6 wherein said location is based upon gaze detection.

13. The method of claim 6 wherein said imaging device and said display do not freely move relative to one another.

14. The method of claim 1 wherein said modifying is based upon a single parameter.

15. The method of claim 1 wherein said modifying is based upon a plurality of parameters.

16. The method of claim 1 wherein said modifying is different for different pixels of said image.

17. The method of claim 1 wherein said modifying is different for different regions of said display.

18. The method of claim 1 wherein said modifying is based upon sensing a plurality of viewers.

19. The method of claim 1 wherein said modifying is based upon the anticipated distance between said viewer and said display.

20. The method of claim 1 wherein said determining is based upon multiple imaging devices.

* * * * *